United States Patent [19]
Kolker

[11] 3,952,144
[45] Apr. 20, 1976

[54] METHODS AND APPARATUS FOR AUTOMATIC BACKGROUND AND CONTRAST CONTROL

[75] Inventor: Carl Raymond Kolker, San Gabriel, Calif.

[73] Assignee: Faxon Communications Corporation, Pasadena, Calif.

[22] Filed: Oct. 2, 1974

[21] Appl. No.: 511,422

[52] U.S. Cl. ............................ 178/6; 178/6.6 R; 178/DIG. 16
[51] Int. Cl.[2] .......................................... H04N 1/40
[58] Field of Search ............. 178/6, DIG. 3, DIG. 16, 178/6.6 R; 360/33

[56] References Cited
UNITED STATES PATENTS

| | | | |
|---|---|---|---|
| 2,909,597 | 10/1959 | Johnson | 360/33 |
| 3,761,610 | 9/1973 | Krallinger | 178/6 |

Primary Examiner—Howard W. Britton
Attorney, Agent, or Firm—Richard Morganstern

[57] ABSTRACT

An automatic background and contrast control unit is used in a facsimile transmitter or receiver unit and operates on the uncorrected video signal representing the shade of source document areas being scanned to produce a corrected output signal which accurately and uniformly represents the full range of black and white and intermediate grey areas of the document. The facsimile transmitter makes a preliminary calibrating scan in which it sequentially scans a known black area and a known white area, and the automatic background and contrast control unit fully automatically stores a first sample of the uncorrected video signal when the known black area is being scanned and stores a second sample of the uncorrected video signal when the known white area is being scanned. During subsequent scanning and transmission of the document, the automatic background and contrast control unit continually produces voltages representing the stored black and white samples and uses these voltages to continuously correct the video signal received during the scanning of the document.

18 Claims, 2 Drawing Figures

METHODS AND APPARATUS FOR AUTOMATIC BACKGROUND AND CONTRAST CONTROL

BACKGROUND OF THE INVENTION

Field of the Invention

This invention relates generally to systems for correcting a variable magnitude input signal which represents an input parameter and which is subject to undesired offsets and gain variations in its representation of that parameter; and more particularly, relates to such systems for use in scanning type facsimile transmission and reception equipment to correct effects and gain variations in the video signal which represents the shade of darkness or lightness (i.e., shade intensity) of source document areas being scanned.

In many facsimile transmission and receiving systems a source document, whose contents are to be transmitted from a facsimile transmitter to a remote facsimile receiver and reproducer, is scanned line by line by a narrowly focused light beam which illuminates the document areas being scanned. The light reflected from the scanned document areas is collected by a suitable photosensor which is positioned adjacent the document to produce a corresponding video signal whose voltage at any instant is representative of the shade of darkness or lightness of the document area being scanned at that instant. This video signal is then applied as one input signal to a suitable transmit modulator, which also receives a variety of synchronizing pulses provided by other elements of the facsimile transmitter and operates to transmit both the video information and the synchronizing signal information by a suitable modulation system (as for example, frequency modulation or PCM, etc.) over a transmission path such as phone lines or a radio transmission path to a remote facsimile receiver.

The signals which are received over the transmission path by the remote facsimile receiver, are first processed in a suitable demodulator, which extracts both the video portion of the signal and also the synchronizing pulse portions of the signal, and produces a corresponding video input signal and synchronizing pulse signals. The video signal is applied as an input to writing means in the facsimile receiver and may be applied, for example, to control the intensity of a light beam which writes upon photosensitive recording paper to reproduce thereon the image being scanned by the reading light beam of the facsimile transmitter. The synchronizing pulses extracted by the demodulator of the receiver are applied to the writing apparatus of the receiver to control the positioning of the writing means and may be applied, for example, to the vertical and horizontal deflection controls of a light beam producing unit to synchronize the horizontal and vertical scans of the writing beam in the receiver so as to illuminate at any time recording areas corresponding to the source document areas then being scanned in the transmitter.

One facsimile transmitting and receiving system, a transceiver employing a cathode ray tube flying spot scanner as the light beam forming unit for both illumination of the source document during transmission operation and writing of the copy document during receiver operation, is described in detail in co-pending application, Ser. No. 312,114, entitled "Graphic Indicia Video Signal Acquisition Transmission and Reproduction System", filed Dec. 4, 1972 by John S. Campbell, et al and assigned to the assignee of the present application now U.S. Pat. No. 3,843,839. Said application, Ser. No. 312,114, is a continuation-in-part of application 219,249, filed Jan. 20, 1972 by Campbell, et al.

In the transmitter of any such facsimile system, the video signal produced by the photocell sensor, which is monitoring the light reflected by the source document from the scanning light beam, is subject to voltage offsets and gain variations which vary during the day and from day to day in accordance with such factors as variations in the intensity of the illuminating light beam; drift of bias and sensitivity of the photosensor beam due to aging or temperature change or voltage variations, etc.; and bias and gain drifts in the preamplifier ordinarily associated with the photocell or photodiode; and many other factors.

All the factors which contribute to the general drift of offset and amplitude in the video signal, can be individually controlled in manners well known to the art but only by use of precise and relatively expensive circuit elements in the individual circuits relating to each factor. Thus, overall in the transmitter, the use of an uncorrected video signal results in placing greater requirements for precise and accurate circuitry and resulting expense.

In a facsimile receiver the very same problem is presented in a more acute form, for in a receiver, if the video signal extracted by the receiver demodulator is not corrected for undesired voltage offsets and gain variations, then such perturbations will, when the video signal is applied to control writing beam intensity, be directly reflected in corresponding perturbations of intensity of the recording light beam, resulting in undesired changes in the shade of the supposedly white background of the recorded or reproduced document and undesired changes and variations of the range of dark and light shades (i.e., contrast) of the image portions of the document. Thus, in a facsimile receiver, failure to eliminate or correct drift of offsets and amplitude variations of the video signal results in reduction of accuracy of reproduction of both background and contrast in the recorded or reproduced document image.

In addition, if correction of the extracted video signal produced by the receiver's demodulator is not available, then it becomes necessary to use more precise and expensive circuitry in the demodulator. In a receiver, drift of offset and amplitude of the extracted or detected video signal is caused by the factors of, drift in time delays in the transmission path, and drift in the voltages and components of the demodulator circuitry. Both factors can be compensated for by careful design of the receiver demodulator with precision components and circuitry, but the expense of the demodulator is correspondingly raised.

THE PRIOR ART

In the field of television, the effects of voltage offset and of gain variations, as related to the shading of the background of the document and the contrast of the image areas of the documents, are generally compensated for by manual adjustment of the brightness control and by automatic control of the gain of the video amplifier in accordance with and in response to sensing of the average amplitudes of the received video signals. The resultant correction of the video signal is quite gross and imprecise but is quite sufficient for a system such as television in which it is expected that fine corrections can be manually made by a human operator of the television set in accordance with his aesthetic appreciation and judgment of the received image.

Such reliance on human intervention is not desirable in a facsimile transmission and reception in which a document will be transmitted and recorded in a single run or frame in a brief period of time, and the delays occasioned by waiting for the human operator to form a judgment as to the aesthetic correctness of the reproduced document would result in loss or deterioration of part or all of the received document. It is clear that reliance on human intervention and judgments results in a necessity for periodic retransmission of documents, which is a very costly and expensive matter because of the high cost of transmission time over conventional transmission paths such as phone lines, commerical radio links, satelite transmission systems. The situation is only partially alleviated by the use of conventional automatic gain control systems which operate in a coarse manner, as described above, to control the overall gain of the video amplifying system. Because of the lack of fine automatic adjustment and correction of offset amplitude, some reproduced documents will have deteriorated background and image contrast values and will have to be either accepted as lower quality reproductions or will require retransmission with consequent cost detriment.

SUMMARY OF THE INVENTION

In the present invention a method and apparatus are provided for precisely and accurately and fully automatically correcting both undesired offsets and undesired gain variations of a variable magnitude input signal which represents an input parameter. A preferred embodiment of such apparatus is shown and described herein which is adapted to be used in a facsimile transmitter and/or receiver to receive a video input signal representing the shade of intensity of darkness or lightness of a document area then being scanned, and operate upon that video input signal to remove and correct the voltage offsets and gain variations to which such an input signal is subject.

The correcting apparatus of the present invention thus functions in the facsimile transmitter or receiver as an automatic background and contrast control unit which operates upon the uncorrected video signal representing the shade of the source document areas being scanned to produce a corrected output signal which accurately and uniformly represents the shade (usually white) of the background areas of a document and also accurately represents the full range of black and white and intermediate gray areas (i.e., contrast) of the document. Such correction of the video input signal is accomplished in both the facsimile transmitter and receiver in a fully automatic manner, without requirement for human intervention or judgments. Use of the signal correcting apparatus of the invention results in substantially improved accuracy of reproduction of background and image contrast values. Because of the full correction of the video input signal which is accomplished by the automatic background and contrast control unit (hereafter identified as an ABC unit) stability requirements for other circuitry of the facsimile transmitter and receiver may be substantially relaxed and relatively inexpensive circuit components can be used without affecting picture quality.

Considering in more detail the overall function of an ABC unit, in a facsimile transmitter, the ABC unit continually receives and operates upon a variable voltage video input signal (from the photocell preamp) which represents the intensity of shade of the target areas being scanned, such shade intensity varying over a range of values between a predetermined black intensity and a predetermined white intensity. In other words, the video input signal represents a whole range of shades of grey between dark black and clear white.

As previously indicated, this video input signal may be subject to undesired offsets and gain variations so that voltage of the input signal does not represent the scanned shade intensity in the standardized or uniform way which is desired. For example, suppose that it is desired that "black" be presented by a 0 volt video signal and that "white" be represented by 1 volt and that all shades of grey between black and white be represented correspondingly by voltages varying between 0 and 1 volt. Suppose further that the actual uncorrected value of the voltage of the video signal was 2 volts for "black" and 6 volts for "white", with shades of grey between black and white being represented by uncorrected video voltages varying between 2 volts and 6 volts. What the ABC does in operating upon such uncorrected video voltage signal is to automatically subtract the 2 volts offset from the signal and to automatically adjust its own internal gain so that the corrected video output signal issuing from the ABC varies in the desired manner between 0 volts and 1 volt for shade intensities varying between black and white.

The manner in which the ABC unit accomplishes such correction is entirely unique. During preliminary calibrating scans, the ABC unit in the transmitter stores a sample of the uncorrected video input signal at a time when a known black area is being scanned, and also stores a second sample of the uncorrected video input signal at a time when a known white area is being scanned. Thereafter during the subsequent scanning and transmission of the document the ABC continually produces voltages representing the stored black and white samples and uses these voltages to continuously correct the video input signal received during the scanning of the document.

If the value of the video input signal is designated as $V_{in}$ and the values of the stored black and white samples are designated as $V_b$ and $V_w$, respectively, the detailed operation of the ABC unit used in the preferred embodiment can be conveniently described. Throughout the scanning of the document the ABC continually subtracts the stored offset voltage $V_b$, from the value of the incoming video input signal, $V_{in}$, to produce an offset corrected video signal representing the value $V_{in} - V_b$. The ABC also continually forms a second signal representative of the difference between the voltage of the white sample ($V_w$) and the voltage of the black sample ($V_b$). This second signal has a value, $V_w - V_b$, and represents the magnitude of the range of variation of the video input signal, $V_{in}$. This is clear from the fact that the video input signal, $V_{in}$ varies between a black representing value $V_b$, over a range of gray values to a white representing value, $V_w$ and thus has a total range of variation equal to $V_w - V_b$.

To accomplish precise gain control, the ABC in a preferred form divides the first signal (the offset corrected video signal, $V_{in} - V_b$) by the second signal (signal $V_w - V_b$ which represents the overall maximum range of the video input signal) to form a fully voltage corrected and gain controlled or normalized video output signal, designated $V_o$, which has a value representative of the resultant fraction or quotient ($V_{in} - V_b/V_w - V_b$).

To demonstrate the gain control and normalization which is inherent in such division of the first and second signal examine the numerator of this fraction ($V_{in} - V_b/V_w - V_b$). It will be noted that since $V_{in}$ varies between values $V_b$ and $V_w$, the numerator, which is the value of the offset corrected input signal $V_{in} - V_b$, will vary from a minimum value of 0 to a maximum value $V_w - V_b$ which is equal in absolute magnitude to the denominator of the fraction. The fraction ($V_{in} - V_b/V_w - V_b$) which represents the value of the fully corrected output signal of the ABC will therefore be a fraction varying between 0 and 1, this result being true for the preferred embodiment described independent of the particular values of $V_b$, $V_w$ and $V_{in}$, and thus being independent of the particular values of the offset or gain variation of the video input signal $V_{in}$.

In this manner, by a process of correcting the video input signal for its offsets and normalizing the video input signal by dividing it by its range, the video signal is fully corrected for both offset and gain variation by the ABC unit.

Referring to the numerical example stated above, if the black sample, $V_b$, has a value of 2 volts and the white sample $V_w$, has a value of 6 volts and the uncorrected video input signal, $V_{in}$, varies over a range of 2 to 6 volts in its representation of document shade intensities, then it is clear on the basis of the above description, that what the ABC will do is to form an offset corrected video signal ($V_{in} - 2$) which will vary from 0 to 4 volts, and will further operate to normalize or gain control this offset corrected video input signal by dividing it by a range representing signal ($V_w - V_b$) of value 4 volts (since $6 - 2 = 4$). The output signal of the ABC represents the quotient of this division and will therefore have values varying between 0 and 1. In this manner, a video input signal which had an offset of 2 volts and which had an unknown gain variation which caused it to range between 2 volts and 6 volts in its representation of shades varying between black and white, is automatically corrected and gain controlled to form a video output signal varying between 0 and 1 volt.

It should be noted that in the preferred embodiment of the ABC which is shown and described herein, the analog divider which is used introduces a scale factor or multiplier of 10 so that in the specific embodiment of the ABC unit described, the fully corrected video output signal varies between 0 and 10 volts rather than between 0 and 1 volt. Obviously, any multiplier or scale factor can be selected and starting level can be selected so as to have the corrected video output signal vary between preselected values.

The manner in which the ABC automatically sequences itself during the calibration cycle to store a "black" sample of the uncorrected video input signal when a known black area of the target is being scanned and to store a "white" sample of the video input signal when a known white area of the target is being scanned is of great interest.

In the facsimile transmitter, the target frame on which the document to be scanned is mounted has affixed thereto, a thin horizontal strip positioned directly above the normal document area. The first, left-hand half of the strip may be imprinted black and the right-hand half of the strip may be imprinted white or be apertured to expose a nominally white background area of the document. The vertical width of the strip is sufficient to permit at least two normal scans of the strip by the scanning beam of the transmitter. During the initial calibration period, the scanning beam is sequenced and directed to preferably make two scans of this black-white calibration strip.

In the first scan of the calibration strip, the ABC unit in the transmitter acquires its black and white samples of the video voltage produced by the photosensor in response to the illumination of the black-white scanning strip by the scanning beam. The black sample is acquired preferably when the scanning beam reaches the approximate center of the black portion of the calibration strip and the white sample is thereafter acquired when the scanning beam reaches preferably the approximate center of the white portion of the calibration strip. (These sample acquisition points are recognized by the ABC by monitoring the horizontal ramp voltages which sweep the scanning beam from left to right across the calibration strip to detect ramp voltage levels corresponding to the sample points.) Once the first scan is completed, the transmitter ABC is fully equipped with the black and white samples which it requires for its operation and is thereafter ready to assist in transmitting accurate, corrected video information to the remote receiver.

During the second scan of the calibration strip, the transmitter is thus able to transmit substantially accurate information to the receiver representing the scanning of the successive black and white areas of the calibration strip. The ABC unit in the receiver receives this information during the second scan (via the transmission path and the receiver demodulator) and operates upon the detected video signal in the same manner to acquire its black and white samples.

During this same second scan, in which the black and white samples are acquired by the receiver ABC, the transmitter ABC recognizes when the scan reaches a point slightly past the white sample acquisition point and terminates the calibration operation by generating and applying to the vertical deflection unit a special ADVANCE voltage signal which causes the vertical deflection unit to advance the scanning beam a predetermined distance (usually about a quarter of an inch) down into the main document area. Thereafter the transmitter proceeds with its normal line-by-line scan of the document which is being transmitted, the receiver receiving the transmitted signal and replicating the scanning operation to reproduce the document on photosensitive recording paper. During such normal transmission of the document, the ABC units in both the transmitter and receiver function in the described manner to correct the respective video input signals using the black and white samples which each of the ABC's acquired during the initial calibration cycle.

DETAILED DESCRIPTION OF THE PREFERRED EMBODIMENT

Figure 1:
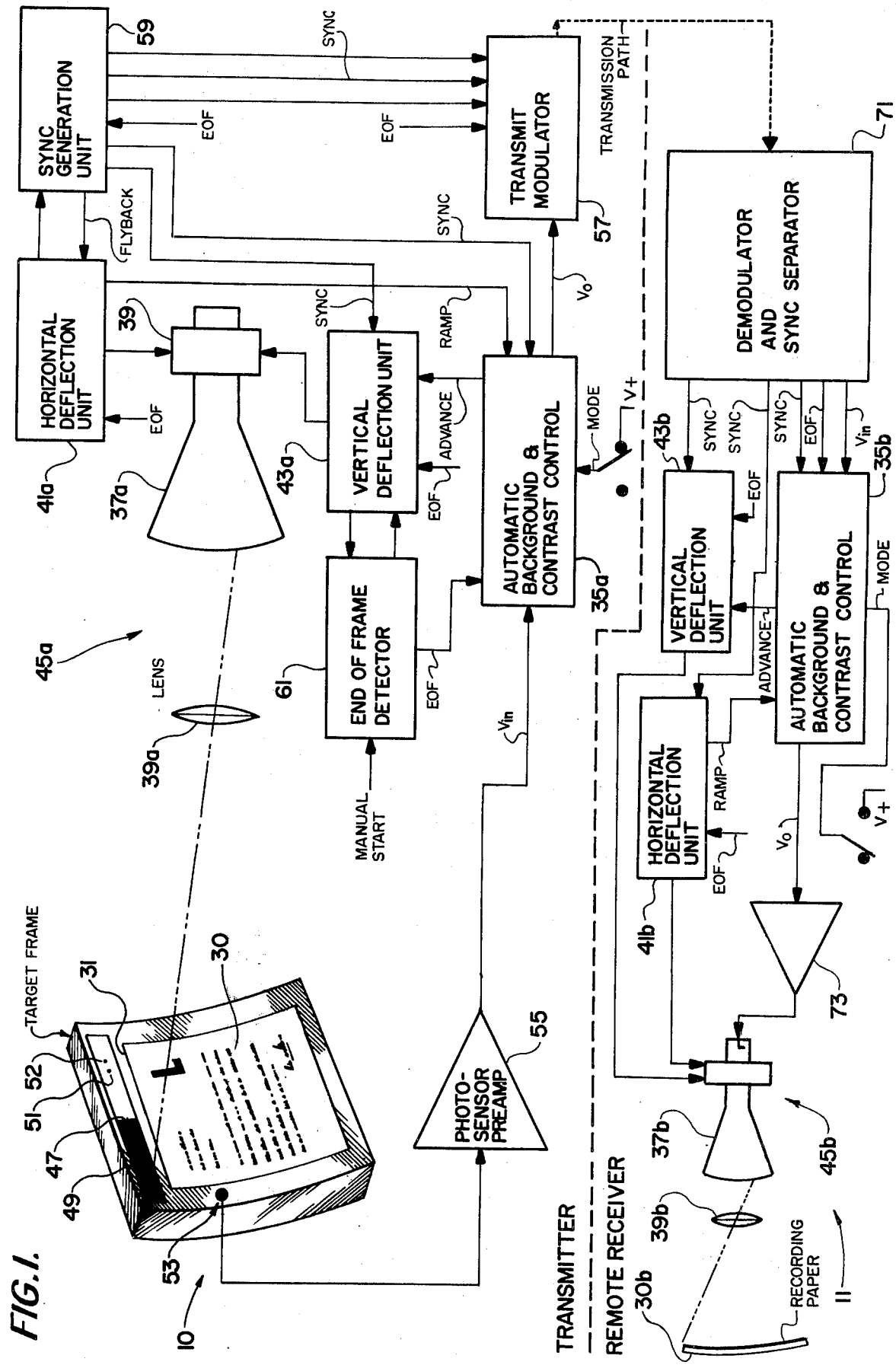
FIG. 1 is a schematic and circuit block diagram of a facsimile transmitter and receiver system employing automatic background and contrast control units according to the present invention.

FIG. 1 shows a schematic and block diagram of a facsimile transmitter generally designated 10 and a facsimile receiver generally designated 11, adapted for substantially simultaneous transmission and remote reception of the image of a document 30 which is mountable on a face 31 of a target frame 32. Both the transmitter and receiver shown in FIG. 1 can be considered to be substantially similar to the transmitter-receiver described in the before-referenced co-pending application, Ser. No. 312,114, now U.S. Pat. No. 3,843,839, to which reference is made for further detailed description of the operation and mechanization of the elements of the transmitter and receiver.

The transmitter and receiver of FIG. 1, however, are each equipped with an utilize respective Automatic Background and Contrast Control Units, 35a and 35b. The Automatic Background and Contrast Control Units (hereafter identified as ABC units) are preferably identical in both the transmitter and receiver and can be considered as common copies of an Automatic Background and Contrast Control Unit 35 (ABC unit 35) which is shown in detail in FIG. 2.

Referring to transmitter 10, its ABC unit is connected to the other elements of the transmitter as shown in the upper portion of FIG. 1 above the horizontal dashed line. The receiver's ABC unit is connected to other elements of the receiver as shown in the lower portion of FIG. 1 below the dashed line. It should be understood that if a convertible transmitter-receiver unit is desired (i.e., a transceiver unit as described in the co-pending application, Ser. No. 312,114, now U.S. Pat. No. 3,843,839) then a single ABC unit may be utilized in such transceiver together with appropriate switching to reconnect the ABC unit to the other elements of the transceiver when the transceiver is switched in mode from transmitter operation to receiver operation.

Referring now in more detail to transmitter 10, as shown in FIG. 1 a conventional cathode ray tube 37a and lens system generally designated 39a together with the cathode ray tube's horizontal deflection unit 41a and its vertical deflection unit 43a form a substantially conventional flying spot scanner generally designated 45a which is capable of forming a narrow light beam which can be swept or scanned under the control of the horizontal and vertical deflection units in successive left to right downwardly progressing scans of the target, until a complete scan of the source document 30 has been completed, at which time the horizontal and vertical deflection units are disabled and the scanning operation remains quiescent during an end of frame period, until a signal Manual Start (or the like) is applied to the transmitter to initiate another frame or sequence of transmission of a source document.

As shown in FIG. 1, the flying spot scanner 45a is adapted so that it begins its scanning operation with its scanning light beam directed at the left-hand portion of a black-white calibration strip 47 which is affixed to the target frame 32 directly above the document image area and which has its first or left-hand half imprinted black and its second right-hand half imprinted white. Alternatively, as before mentioned, the calibration strip may, if desired be positioned at the extreme upper portion of the document 30 with the second half of strip 47 being apertured or absent to expose the background area of the document itself as the "white" portion of the calibration strip. Such an alternative usage of the calibration strip has the effect of causing the background areas of the document to be reproduced as clear white even though tinted or otherwise slightly shaded paper is used in the source document.

Referring still to calibration strip 47, for purposes of future reference points 49, 51, and 52 are identified in calibration strip 47, point 49 corresponding to the approximate center position of the black portion of the calibration strip, point 51 corresponding to the approximate center of the white portion of the calibration strip, and point 52 being a point which is slightly beyond (i.e., to the right of) point 51.

As further shown in FIG. 1, a photosensor generally designated 53 is positioned adjacent to the target areas being scanned, to collect light which is reflected by the scanning beam from the black and white areas of calibration strip 47 and from the background and image areas of the source document 30. The photosensor 53 in response to the fluctuating values of the reflected light generates and applies a correspondingly varying electrical signal to a photosensor preamplifier 55. The output of photosensor preamplifier is an uncorrected variable voltage video input signal, designated $V_{in}$, which represents the intensity of shade of the target areas being scanned, such shade intensity varying over a range of values between a black intensity and a white intensity. The video input signal $V_{in}$ is subject to undesired voltage offsets and gain variations because of drifts in the voltage and circuitry of the light forming, light detecting, and signal amplifying elements of the overall system. As shown in FIG. 1, photosensor preamplifier 55 applies such uncorrected video input signal $V_{in}$ to the video input of the ABC unit 35a so that the ABC unit can operate upon the uncorrected video input $V_{in}$ to produce a corresponding corrected video output signal $V_0$. Such output signal $V_0$ is applied by the ABC unit to the video input of the transmitter's transmit modulator 57 for incorporation in a modulated signal which is formed by transmit modulator 57 and transmitted over a predetermined transmission path to remote receiver 11.

Referring still to transmitter 10, as shown in FIG. 1 horizontal deflection unit 41a applies sawtooth type ramp voltage signals to deflection coils 59 of cathode ray tube 37a so as to drive the scanning beam in its successive left to right scanning deflections. Horizontal deflection unit 41a also applies corresponding ramp voltage signals to a synchronizing pulse generation unit which is designated as Sync Generation Unit 59 and also applies a corresponding ramp voltage signal designated RAMP to ABC unit 35a.

Sync Generation Unit 59 operates as a precision level detector and pulse generator which monitors the voltage levels in the horizontal ramp signal applied to it by horizontal deflection unit 41a and detects when voltage levels are attained corresponding to an end of line position of the scanning beam. At such point Sync Generation Unit 59 produces a plurality of synchronizing pulse signals including: a FLYBACK pulse signal which is applied back to horizontal deflection unit 41a to cause flyback of its ramp voltage at end of line; a SYNC pulse signal which is applied to the vertical deflection unit 43a to cause it to increase its deflection voltage so as to make a vertical deflection of the scanning beam to the next successive line which is to be scanned; and a corresponding SYNC pulse which is applied to ABC unit 35a. Sync Generation Unit 59 also applies a plurality of synchronizing pulses, including the SYNC pulse signal to transmit modulator 57 so that transmit modulator 57 is able to incorporate such synchronizing information in its modulated output signal for transmission to receiver 11 to direct the scanning operations of receiver 11 in slaved synchronism with the scanning operations of transmitter 10.

The vertical deflection unit 43a, in addition to applying a vertical deflection voltage signal to deflection coils 39 of cathode ray tube 37a, also applies a corresponding deflection voltage signal to an End of Frame Detector Unit 61 which functions as a precision level detector and latch. End of Frame Detector 61 latches or changes state to produce and end of frame signal designated EOF whenever the vertical deflection voltage which it receives reaches a level corresponding to the completion of scanning of a full page. When the end of frame condition is thus detected by detector unit 61, it applies the signal EOF at its high level to vertical deflection unit 43a, horizontal deflection unit 41a, and Sync Generation Unit 59 to cause them to be quiescent and suspend their production of scan deflection voltages and synchronizing pulses. At this same time, at end of frame, the EOF signal is applied as a general "reset" signal to the ABC unit and is also applied to an input of the transmit modulator 57 so that the end of frame information will be incorporated in the modulated output signal of the transmitter and thereby made available to facsimile receiver 11.

Once the end of frame EOF signal has been generated the transmitter remains quiescent, with the scanning beam passively directed as shown in FIG. 1 at the beginning of the calibration strip, until such time as the manual start signal (MANUAL START) is applied to an input of End of Frame Detector 61 to unlatch or reverse the state of detector 61 and thereby switch its output signal EOF to its low level. When the EOF signal is so switched to its low level (EOF') the suppression of the operations of the scanning system is lifted and the transmitter again begins its ordinary scanning operations for the scanning and transmission of another frame of a source document.

As noted, the ABC unit 35a receives the uncorrected video voltage signal $V_{in}$, the end of frame signal EOF, the horizontal ramp signal RAMP, and the end of line synchronizing signal SYNC. The ABC unit also receives a mode information signal MODE which indicates to the ABC whether it is to function as part of a transmitter or as part of a receiver. The MODE signal is generated by a single pole two position switch which is connected at one position to a source of positive voltage V+ representing a "high" logic level (indicating that the ABC is to function as part of a transmitter), and is switchable to a second position which is open circuited representing a "low" logic level (indicating to the ABC that it is to function as part of a receiver). The ABC unit 35a produces a corrected video output signal $V_o$, which as herebefore stated is applied to the input of transmit modulator 57, ABC unit 35a also produces and applies to vertical deflection unit 43a, at appropriate times, a special negative voltage logic level signal designated the ADVANCE signal which, when it is issued, causes vertical deflection unit 43a to increase its deflection by a predetermined amount so as to deflect the scanning beam down from calibration strip 47 and into the main image areas of source document 30.

This completes the summarization of the input and output signals of ABC unit 35a and makes it possible to describe in more detail the operations of ABC unit 35a in conjunction with the other circuitry of transmitter 10.

In operation, it will be assumed that initially transmission of a previous document has been finished, the end of frame condition exists as signaled by the production of the signal EOF at its high level, and the scanning apparatus of the transmitter is quiescent because of the presence of signal EOF. This quiescent end of frame condition continues until such time as the Manual Start signal is applied to end of frame detector 61 to unlatch it and thereby send signal EOF to its low level permitting scanning operations to begin.

As previously indicated, because of the normal starting position of the scanning beam, the first scan will be executed from left to right across the successive black and white areas of calibration strip 47. During this first scan as the scanning beam approaches point 49, the ABC detects that the scanning beam has reached such point, as indicated by the corresponding voltage attained by the horizontal ramp signal RAMP, and stores a first sample, designated the "black sample" of the uncorrected video voltage signal $V_{in}$, this black sample being representative of the shade intensity of the black area then being viewed by the scanning beam. As this first scan of the calibration strip 47 continues, the scanning beam reaches the region of point 51 at the center of the white area of the calibration strip and at this time, in the same manner, the ABC functions to store a second sample designated the "white sample" of the uncorrected video input signal $V_{in}$, in this white sample being representative of the shade intensity of the white area of the scanning strip then being viewed. In the continuation of the first scan of calibration strip 47, the scanning beam next reaches point 52 and then passes on to reach a point corresponding to the end of a scanning line. During this first scan the ABC unit does not respond to the scanning beam reaching point 52 (such response is reserved for the second scan of calibration strip 47). As the scanning beam reaches the end of line position during the first scan, the corresponding voltage level of the horizontal ramp is detected by sync generation unit 59 which thereupon issues its synchronizing pulse RESET and SYNC to cause the horizontal deflection voltlage to fly back so as to begin the second scan, and to cause vertical deflection unit 43a to deflect the scan down one line (that is, a few hundredths of an inch). The SYNC pulse is also applied at this time to ABC unit 35a to indicate to the ABC that the first line scan of scanning strip 47 has been completed and that the second scan of calibration strip 47 is about to begin.

During the secoond scan of calibration strip 47, ABC unit 35a, because it has already stored its black and white samples in latching type storage devices, does not make any response to the scan passing point 49 or 51 of calibration strip 47; but the ABC does, in this second scan respond when the scanning beam reaches point 52. When point 52 is reached, the ABC produces a special low logic level output signal ADVANCE which is applied to vertical deflection unit 43a to cause the scanning beam to promptly deflect downward a substantial amount (approximately 1/4 of an inch in the preferred embodiment) down into the main image area of source document 30. Thereafter, normal line by line scanning of source document 30 continues until document scan is completed at the end of the first frame. This end of frame condition is detected by end of frame detector 61, which again produces signal EOF at its high level to return the transmitter to its quiescent or idling end of frame starting position.

It should be understood that during the whole normal scan of document 30 which follows the preliminary calibration cycle, ABC unit 35a uses the stored black sample and white sample which it acquired during the calibration cycle to continually process and operaate upon the video signal $V_{in}$ which represents the varying shade of the document areas being scanned, to produce the fully corrected video output signal $V_0$ which is applied to transmit modulator 57 so as to be incorporated in the modulated signal which is sent over the transmission path to facsimile receiver 11.

Referring now in FIG. 1 to facsimile receiver 11, because of the quite detailed description which has been provided of transmitter 10, it is now possible to quite briefly summarize the corresponding structure and operations of receiver 11.

In receiver 11, a Demodulator and Sync Separator unit 71 is provided which receives the modulated signal transmitted to it by transmit modulator 57 of transmitter 10. Demodulator and Sync Separator 71 extracts from the received signal a corresponding video signal which has been subjected to distortion in the transmission path and to various voltage gain variations in the demodulator portion of unit 71, and applies this video voltage analagously designated as uncorrected video signal $V_{in}$ to ABC unit 35b. Demodulator and Sync Separator 71 also extracts from the transmitted signal corresponding synchronizing pulses SYNC and EOF which are applied as shown to ABC unit 35b and also to horizontal deflection unit 41b and 43b to synchronize and order the scanning operations of receiver unit 11 in slaved synchronism to the corresponding scanning operations of transmitter 10.

The corrected output signal analogously designated $V_0$ which is produced by ABC unit 35b is applied through an amplifier 73 to the cathode ray tube 37b to control the intensity of the scanning light beam which is formed by cathode ray tube 37b and its associated lens sytem 39b and focused on the corresponding areas of the photosensitive recording medium which serves as the copy document 30b. The cathode ray tube 37b with its associated elements forms a flying spot scanner 45b which is driven in its horizontal and vertical scanning operations by horizontal and vertical deflection units 41b and 43b respectively, in the manner hereinbefore described, under the control of the various synchronizing pulses provided by Demodulator and Sync Separator 71. Just as in the transmitter, ABC unit 35b receives the Ramp signal from horizontal deflection unit 41b and at the appropriate time applies the Advance signal to vertical deflection unit 43b.

The receiver ABC unit 35b has one significant difference in its operation. In the receiver, the MODE signal is switched to present an open circuit condition to ABC unit 35b. In response to this state of the MODE signal, receiver ABC unit 35b is inhibited and is unresponsive during the first scan of the calibration strip 47 by transmitter 10 and is only released from its inhibition during the second scan of calibration strip 47 (i.e., after the first sync pulse has been received at the end of the first line). Thus, in receiver operation, ABC unit 35b acquires its black and white voltage samples of the video input signal $V_{in}$ only during the second scan of the calibration strip 47. In all other respects, the operation of receiver ABC unit 35b is identical to the operation of transmitter ABC unit 35a.

Figure 2:
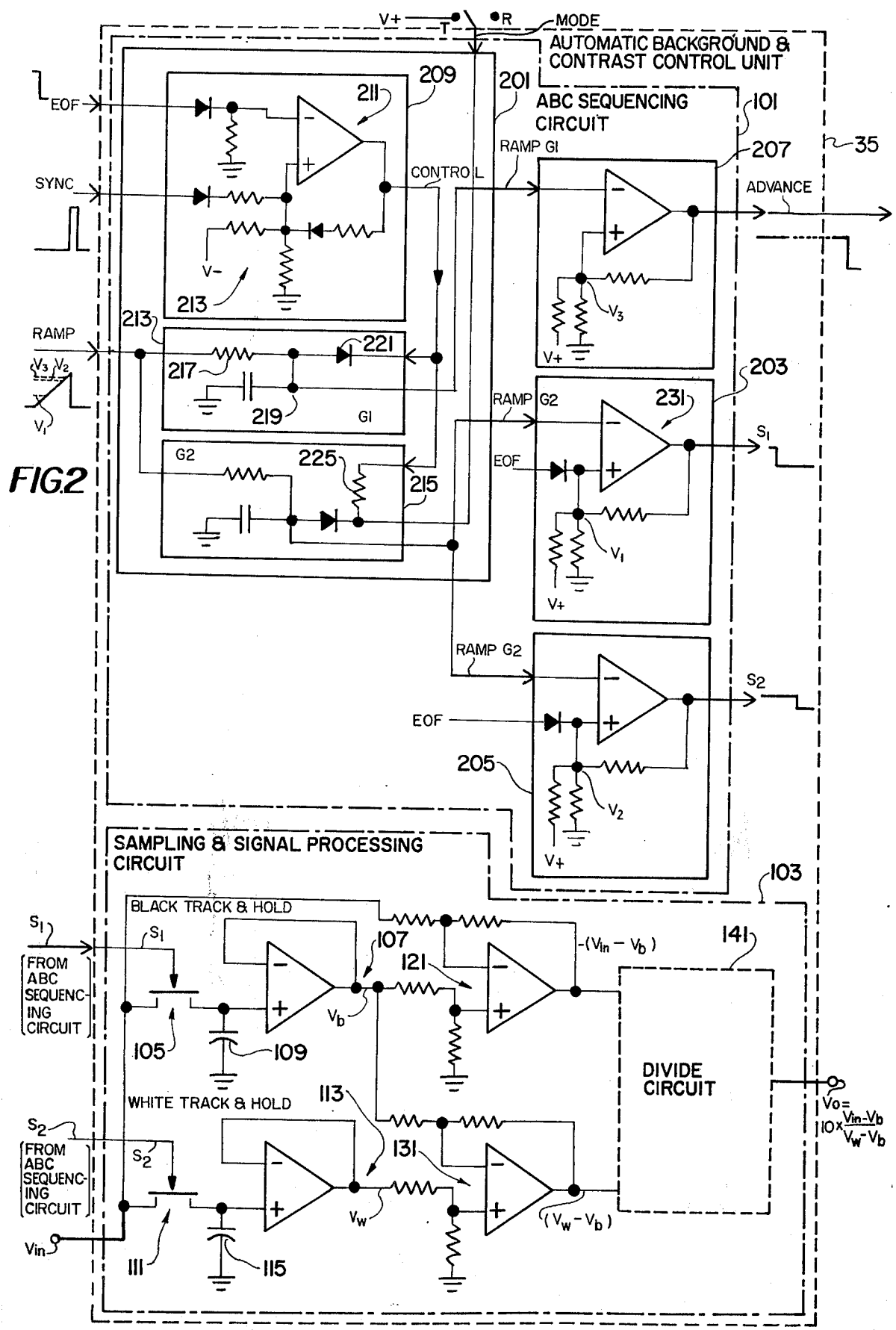
FIG. 2 is a detailed block and circuit diagram of an automatic background and contrast control unit which may be used in the transmitter-receiver system of FIG. 1.

Referring now to FIG. 2, there is shown a preferred generic embodiment of an automatic background and contrast control unit or ABC unit 35 which can function either as a transmitter ABC unit or a receiver ABC unit in accordance with the condition of the MODE signal which is applied to the ABC unit, the MODE signal being switchable between a voltage state V+ (representing the transmit mode) and an open circuit condition (representing the receiver or reception mode). As previously noted, ABC unit 35 additionally receives input signals EOF, SYNC, RAMP, and $V_{in}$ and produces output signals ADVANCE and $V_o$ (the corrected video output signal). ABC unit 35 comprises two major circuits, an ABC Sequencing Circuit 101 and a video Sampling and Signal Processing Circuit 103.

Referring more particularly to Sampling and Signal Processing Circuit 103, this circuit receives three input signals. It receives the uncorrected video voltage signal $V_{in}$ which is to be operated upon by the processing circuit 103, and also receives a pair of gating or sampling signals $S_1$ and $S_2$ which are received from ABC Sequencing Circuit 103 and which indicate respectively when the black and white samples of the video voltage signal $V_{in}$ are to be stored by the Sampling and Signal Processing Circuit 103. As shown in FIG. 2, the signal $V_{in}$ is applied through an FET gate generally designated 105 to the (+) input of an operational amplifier generally designated 107. The storage capacitor 109 is connected between the same (+) input terminal of operational amplifier 107 and ground. In overall operation the operational amplifier 107, storage capacitor 109 and gate 105 act as a black track and hold circuit which merely "tracks" or reproduces at its output the applied video input signal $V_{in}$ so long as the FET gate 105 is held closed or conductive by the application of signal $S_1$ at its high level to the gate electrode of FET 105, and which holds or stores whatever signal is then appearing at its input when FET gate 105 is opened or non-conductive by the sampling signal $S_1$ switching to a low level to order the storage of the black sample $V_b$. Once the black sample has been stored in capacitor 109 the operational amplifier 107 continually produces a corresponding output voltage $V_b$ for the remainder of the frame, until signal $S_1$ is again switched back to a high level.

In the same manner, as shown in FIG. 2, an FET gate 111, a storage capacitor 115 and an operational amplifier generally designated 113 are connected together to function as a white track and hold circuit which tracks the video input signal $V_{in}$ until sampling signal $S_2$ switches to a low level to indicate that the white sample of signal $V_{in}$ is to be stored, with the operational amplifier 113 thereafter reproducing the stored white sample as an output signal $V_w$ throughout the remainder of the frame of transmission of the source document.

As shown in FIG. 2 the output signal $V_b$ of the black track and hold operational amplifier 107 is applied to the (+) input of an operational amplifier generally designated 121 which also continually receives at its (−) input the video input signal $V_{in}$ and operates to combine these two signals subtractively to produce an output signal representing the negative value of the quantity $V_{in} - V_b$. The output signal $V_b$ of the black track and hold operational amplifier 107 is also applied to the (−) input of an operational amplifier generally designated 131, amplifier 131 also receiving at its (+) input the output signal $V_w$ representing the stored white sample. Operational amplifier 131 functions to combine $V_b$ and $V_w$ representing the stored black and white samples respectively and combines them subtractively to produce an output signal representing the quantity $V_w - V_b$. As before discussed, the signal $V_{in} - V_b$ represents the offset corrected value of the video voltage signal $V_{in}$ and the output signal $V_w - V_b$ represents the full "range" of variation of the video input signal $V_{in}$ in its representation of the shades of brightness or darkness of the document areas being scanned.

As further shown in FIG. 2, the inverted output signal $-(V_{in} - V_b)$ is applied as a numerator input signal to a divide circuit 141, and the other output signal $V_w - V_b$ is applied as a denominator input signal to the same divide circuit 141. Divide circuit 141 operates to divide the numerator signal by the denominator signal to continually produce a corresponding fully corrected and gain controlled or normalized video output signal $V_o$ which is representative (because of a scale factor −10 which the divider circuit introduces) of the quantity 10 $\times (V_{in} - V_b/V_w - V_b)$. As before explained, the fraction $(V_{in} - V_b/V_w - V_b)$ represents a normalized quantity which can only vary between zero and one, so that the fully corrected and normalized video output signal $V_o$ is thereby constrained to swing between zero and 10 volts (or other preselected limits) in its representation of the shades of brightness or darkness of the document areas being scanned.

The ABC sequencing circuit 101 which forms the second major block of ABC unit 35 shown in FIG. 2, will now be described in greater detail so as to demonstrate the manner in which the sampling signal $S_1$ and $S_2$ are generated by circuit 101 to order the storing of the black and white samples respectively, and also to demonstrate the manner in which the special ADVANCE signal is generated at a low logic level to order the downward deflection of the scanning beam away from the calibration region and down into the main image area of the source or copied document.

As previously indicated, ABC sequencing circuit receives the signals EOF, SYNC, and RAMP and the transmit or receive MODE indicating signal, and responds to these input signals to produce the output signal ADVANCE, $S_1$, and $S_2$ at the appropriate times. As shown in FIG. 2, the MODE signal is switched so as to be connected to a source of voltage V+ indicating in this position that the ABC sequencing circuit 101 is to be operating in a transmission mode, i.e., that we are first considering the use of ABC unit 35 in a facsimile transmitter. It will be further recalled that during such transmission, the sampling signals $S_1$ and $S_2$ and the signal ADVANCE are all to be produced during the same first scan by the scanning beam of calibration strip 47, the signal $S_1$, at its low level being produced when the scanning beam reaches the region of point 49, the signal $S_2$ at its low level being produced when the scanning beam reaches the region of point 51 and the ADVANCE signal being produced when the scanning beam reaches the region of point 52. The position of the scanning beam is detected by ABC sequencing circuit 101 by monitoring the voltage levels reached by the RAMP signal which orders the left to right deflection of the scanning beam. As indicated by the abbreviated waveform sketch of signal RAMP which is provided adjacent its input lead, during a line scan the signal RAMP arises past successive voltage levels $V_1$, $V_2$ and $V_3$ as the scanning beam is deflected from left to right past points 49, 51 and 52 respectively of the calibration strip 47. These voltage levels $V_1$, $V_2$ and $V_3$ are therefore the voltage levels which are detected by ABC sequencing circuit 101 by appropriate latch and level detecting circuits to cause the production of the required output signals $S_1$, $S_2$ and ADVANCE.

As shown in FIG. 2, ABC sequencing circuit 101 includes a control circuit 201 which functions overall to receive the RAMP signal and to gate through or pass through the RAMP signal at appropriate times for application as gated ramp signals (designated $RAMP_{G1}$ and $RAMP_{G2}$) to a series of latch and level detector units 203, 205 and 207 which produce the signals $S_1$, $S_2$ and ADVANCE respectively. As further shown in FIG. 2, control circuit 201 includes a latching control circuit 209 which can be considered as a line control latch which, first receives EOF at its high level and then signal SYNC at its high level, and responds to the successive signals to switch to first or second conductivity states or latching states which indicate to the rest of the system whether the system is operating in the initial period preceding and including the first line scan, or whether the system is operating in the period of the second line scan.

Line control latch 209 as shown in FIG. 2 comprises an operational amplifier generally designated 211 having a positive signal passing input diode on each of its (−) and (+) inputs respectively and also having a series feedback path from its output to its (+) input through a resistance and a positive passing diode. A resistive divider network generally designated 213 is also included in the operational amplifier 211 to provide a predetermined negative bias to the (+) input of the operational amplifier and to the cathode of the operational amplifier's feedback diode. The bi-level output signal of operational amplifier 211 is designated as the signal CONTROL and is, as shown in FIG. 2, supplied to control inputs of a gate 213 hereinafter designated as the G1 gate and to a control input of a gate 215 hereinafter designated as the G2 gate. G2 gate 215 also receives the signal MODE at a second control input thereof as an additional control signal to the gate.

As further indicated in FIG. 2, gate G1 is seen to be a conventional diode gate in which the RAMP signal is applied as an input signal to the gate through a series resistor 207 to an output terminal 219 of gate G1. The signal CONTROL is applied through the cathode of a shunt diode 221 whose anode is connected to the same output terminal 219 of gate G1. The diode 221 is back biased and nonconductive when the signal CONTROL is at a high or positive level, so that in operation gate G1 will "pass through" (gate through) the signal RAMP as the corresponding gated ramp signal $RAMP_{G1}$ only when the signal CONTROL is at a high logic level. At all other times, the gated ramp signal $RAMP_{G1}$ will be held at a negative level by the signal CONTROL at its low logic level.

Similarly, referring to the G2 gate 215 it is seen that gate G2 is another conventional diode gate to which the signal RAMP is applied to appear as a corresponding gated ramp signal $RAMP_{G2}$. Signal MODE provides the primary control for the operation of the gate G2. The signal CONTROL is internally applied through a resistor 225 to the main control input of the gate to thereby serve as a secondary control for gate G2. During transmission, because of the low impedance of the source of voltage V+ which is used as the MODE signal, the MODE signal holds gate G2 open to pass the RAMP signal entirely independent of the values of the signal CONTROL which is only available through the relatively high impedance resistor 225. Thus, in overall operation, during transmit the RAMP signal is passed through gate G2 quite independent of whether the system is in the initial period including the first line scan or is in the period of the second line scan.

The gated ramp signal $RAMP_{G2}$ is applied as an input signal to operate the latch and level detection circuit 203 and also as an input signal to operate the latch and level detection circuit 205. Circuit 203 as shown in FIG. 2 comprises an operational amplifier generally designated as operational amplifier 231 which receives signal $RAMP_{G2}$ at its (−) input, receives reset signal EOF at its (+) input, and has a resistive divider network which applies a biasing voltage $V_1$ to its (+) input and to the anode of its feedback diode. As so connected, operational amplifier 231 functions as a latch and level detector unit which is initially switched by signal EOF at its high level to a conductivity state at which the unit produces output signal $S_1$ at a high level. The feedback diode of operational amplifier 231 is then back biased so that operational amplifier 231 will continue to remain in this high level conduction state until an appropriate signal is received at the (−) input of operational amplifier 231. Assuming EOF is low, when the signal $RAMP_{G2}$ is passed through to the negative input of operational amplifier 231, it operates to switch or latch amplifier 231 negative. As $RAMP_{G2}$ rises to the voltage level $V_1$ (matching the bias voltage $V_1$ which is applied to the (+) input and feedback diode of amplifier 231), the feedback diode becomes conductive and the amplifier 231 is thereby switched so as to latch in its opposite conductivity state at which signal $S_1$ is produced at a low or negative voltage state.

As shown in FIG. 2, the latch and level detection circuit 205 is identical to circuit 203 except that its internal resistive divider network applies the voltage $V_2$ as a bias voltage to the (+) input of its operational amplifier and to the anode of the corresponding feedback diode. Circuit 205 receives the gated ramp signal $RAMP_{G2}$ at its (−) input and also receives the reset signal EOF which is applied through an input diode to the (+) input of operational amplifier 205.

Similarly, referring to latch and level detection circuit 207, circuit 207 comprises an operational amplifier which receives the gated ramp signal $RAMP_{G1}$ at its negative input, and has the normal series diode-resistor feedback path from its output to its (+) input. The operational amplifier of circuit 207 also has a resistive network which applies the voltage $V_3$ to its (+) input and to the anode of its feedback diode as a biasing voltage thereto which determines the initial state of the operational amplifier and which determines the voltage $V_3$ at which the input signal applied to the (−) input of the operational amplifier will cause the circuit to switch over and latch in its opposite conduction state to produce the signal ADVANCE at a low or negative voltage state.

Referring to the above described circuits 203, 205 and 207, it is clear that each of these circuits functions in the same manner, to initially assume a positive output signal producing state in response to its corresponding biasing voltage $V_1$, $V_2$ or $V_3$ (this action being reinforced in circuit 203 and 205 by reset signal EOF), and to switch over and latch into the opposite conduction state when its RAMP input signal passes the corresponding bias voltage $V_1$, $V_2$ or $V_3$.

It is now possible, in view of the foregoing description, to quite briefly describe the operation of the ABC sequencing circuit when used in the transmit mode. It can be assumed that initially a previous document transmission has been completed and the overall system is in its end of frame condition in which reset signal EOF is at a high level. In response to the reset signal EOF at its high level, line control latch 209 is switched to and latches in a conduction state at which it produces its output signal CONTROL at a low or negative voltage state. The signal CONTROL at its negative value causes diode 221 of gate G1 to be conductive and therefore substantially the same negative value of signal CONTROL appears on the $RAMP_{G1}$ input line and serves to switch latch and level detector circuit 207 to a conduction state at which it produces the signal ADVANCE as a high or positive output voltage state. This conduction state of circuit 207 is reinforced by the biasing voltage $V_3$ which is applied to it by its resistive divider bias network. Signal CONTROL at its negative state is also applied to the secondary control input of G2 gating circuit 215, but because of the relatively high impedance of resistor 225, it does not have any effect and is swamped by the relatively low impedance voltage of signal MODE.

In this setting up of the initial conditions of all the switching circuits, reset signal EOF is also applied to circuits 203 and 205 to establish initial conditions and has the effect when reset signal EOF is at its high level (corresponding to end of frame) of switching circuits 203 and 205 to a conduction state at which they produce signals $S_1$ and $S_2$ respectively at a high or positive voltage state. For both circuits 203 and 205, the stated initial conduction states are reinforced by the effect of their respective bias voltages $V_1$ and $V_2$.

Thus, during end of frame when reset signal EOF is at a high or positive voltage state, it has the effect of switching circuits 209, 203, 205, and 207 to initial condition conduction states at which signal CONTROL is produced as a negative voltage (indicating that the second line scan has not yet begun), signal $S_1$ is high or positive (ordering black tracking) signal $S_2$ is also high or positive, (ordering white tracking) and signal ADVANCE is high or positive (indicating that the negative actuating value of signal ADVANCE has not yet been produced).

This initial condition setup is ended after the MANUAL START signal is issued and the end of frame condition is therefore terminated so that reset signal EOF is sent to its low or negative state. The transition of signal EOF to its low state has no immediate effect because all the latches involved remain latched in their initial condition states because of the threshold voltage levels at the (+) inputs to each amplifier, and the isolating effect of their feedback diodes and of their input diodes. Thus, during the first line scan, which begins with the transition of signal EOF to its low state and the consequent production of the upwardly rising ramp voltage of signal RAMP, all the switching circuits (circuits 203, 205, 207, and 209) remain in their initial condition states as described above until some further action occurs.

During the first line scan therefore, the output signal CONTROL of circuit 209 is continuously produced at its negative or low state, this having the effect of completely swamping and suppressing the passage of the gated ramp signal $RAMP_{G1}$ to circuit 207. Thus, during the complete first line scan, circuit 207 remains in its initial condition state and the negative voltage or low state of signal ADVANCE is therefore not produced during the first line scan of the transmit mode.

As before described, however, signal CONTROL at its low level is not effective to block the gated ramp signal $RAMP_{G2}$ and therefore during the first line scan of the transmit mode, as signal RAMP rises past voltage $V_1$, circuit 203 is switched over to its opposite conduction state so as to produce signal $S_1$ at its negative or low state value, thus ordering the sampling or holding of the black sample at this time. In the same manner, as the signal RAMP continues to rise through the voltage level $V_2$, circuit 205 is then switched over to its opposite conduction state so as to produce the signal $S_2$ at its negative or low state value to order the sampling or holding of the white sample.

Thus, as required, during the first line scan of the transmit mode, the black and white sampling signals $S_1$ and $S_2$ are issued at their low states at the appropriate time corresponding to the scanning beam reaching points 49 and 51 respectively of the calibration strip 47. During the same first line scan, however, the signal ADVANCE is left unchanged at its high state and thus does not respond during this first line scan to the passage of the scanning beam past point 52 of calibration strip 47.

At the end of the first line, signal SYNC is issued which has the effect in ABC sequencing circuit 101 of switching over the conduction state of circuit 209 so as to now produce the signal CONTROL at a high level, indicating that the system is now in the second line scan, and permitting the RAMP signal to now pass through G1 gate 213 to be applied therefrom as the gated ramp signal $RAMP_{G1}$ to latch and level detect circuit 207. Therefore, during the second line scan, both $RAMP_{G1}$ and $RAMP_{G2}$ are passed through by their respective gates and permitted to reach the inputs of the corresponding latch and level detect circuits.

Thus, in transmit, during the second line scan circuit 207 is able to respond to $RAMP_{G1}$, and when $RAMP_{G1}$ reaches the voltage level $V_3$ (corresponding to the scanning beam reaching point 52 of calibration strip 47), latch and level detector circuit 207 is then switched over to its opposite conduction state so as to produce its output signal ADVANCE at a negative level or low state and thereby order the downward deflection of the scanning beam away from calibration strip 47 and down into the main image area of the source document 30.

During this same second line scan, circuits 203 and 205 remain latched in the conditions and states which they attained during the first line scan and therefore continue to maintain their output signals $S_1$ and $S_2$ negative so as to maintain the holding of the black and white samples throughout the second line scan and, in fact, throughout the whole of the corresponding transmission frame in which document 30 is scanned and its contents transmitted to the remote receiver. Thus, during the complete transmission frame signals ADVANCE, $S_1$ and $S_2$ remain negative in a low state so as to preserve the additional vertical deflection which has been ordered and to preserve the black and white samples for use throughout the frame.

After document transmission has been completed the end of frame standby or idling condition is again reached at which reset signal EOF returns to its positive voltage level or high state. In response to the return of reset signal EOF to its high level, all the switching circuits of ABC Sequencing Circuit 101 once again return to their initial conditions, as previously described, and the described cycle of operation of ABC sequencing circuit 101 is ready to begin once again with the next transmission of document 30 as signaled by the application of the next MANUAL START signal.

Because of the very detailed description which has been given hereabove of the operation of ABC Sequencing Circuit 101 during a transmit mode, it is now possible to very briefly summarize and describe the corresponding operation of ABC Sequencing Circuit 101 when it is operated in a receive mode as part of a facsimile receiver, such as receiver 11 of FIG. 1.

During receive, signal MODE is switched to an open circuit condition so that signal MODE does not have any effect upon the G2 gating circuit 215, and thus during receive the operation of G2 gating circuit 215 is controlled instead by the high or low state voltage levels of signal CONTROL. As before indicated, signal CONTROL will be low or negative during the initial period including the first line scan, and will be high or positive during the second line scan. In this manner, signal CONTROL blocks the passage of signal RAMP through G2 gate 215 during the first line scan and permits the passage of signal RAMP through G2 gate 215 during the second line scan. Thus, circuits 203 and 205 are, in receive, unresponsive during the first line scan and produce the black and white sampling signals $S_1$ and $S_2$ only during the second line scan. All of the other operations of ABC sequencing circuit 101 remain unchanged so that, as before, circuit 207 produces its output signal ADVANCE at a negative value during the latter portion of the second line scan. It is therefore seen that during receive, ABC Sequencing Circuit 101 produces its signals $S_1$, $S_2$ and ADVANCE at the required times corresponding to the passage during the second line scan of the scanning beam past points 49, 51 and 52 respectively of calibration strip 47.

In this manner, through the operations of ABC Sequencing Circuit 101, in the receive mode receiver 11 is able to defer its acquisition of black and white samples until the first line scan has been completed in which the transmitter acquires black and and white samples. The transmitter can therefore transmit meaningful and accurate information to the receiver during the second line scan which the receiver can utilize during the second line scan to acquire its own black and white samples.

Other embodiments of the present invention and modifications of the embodiments presented herein may be developed without departing from the essential characteristics thereof. Accordingly, the invention should be limited only by the scope of the claims appended below.

What is claimed as new is:

1. Apparatus for processing a variable magnitude input signal representative of an input parameter which varies between predetermined first and second magnitudes, said apparatus comprising:
   A. means for storing a first sample of said input signal when said input parameter is at its first magnitude;
   B. means for storing a second sample of said input signal when said input parameter is at its second magnitude;
   C. and means, operable during a reception period in which said input signal is representing varying magnitudes of said input parameter, for continually combining said input signal and said first and second samples to continually produce an output signal representative of the difference in magnitude of said input signal and said first sample divided by the difference in magnitude of said first and second samples, whereby said output signal is normalized so as to represent the magnitude of said input parameter as a fraction of the range established by the difference in magnitude of said first and second samples.

2. The apparatus defined by claim 1 wherein said means for combining said input signal and said first and second samples includes a first circuit means responsive to said input signal and said first sample to continually produce a difference signal representative of their difference in magnitude, and further includes a second circuit means responsive to said first and second samples for continually producing a second difference signal representative of their difference in magnitude, and further includes divider circuit means responsive to said first and second difference signals for producing said output signal representative of the quotient of their magnitudes.

3. The apparatus defined by claim 1 wherein said means for storing a first sample of said input signal includes a storage capacitor connected in shunt connection to the input of an operational amplifier, said storage capacitor being normally conductive connected through an electronic gate to receive and track the variable magnitude input signal and operable whenever its said electronic gate is non-conductive for holding as a stored sample the last received value of the input signal.

4. The combination defined by claim 1, wherein said apparatus is used in combination with a facsimile transmitter which generates a ramp deflection voltage to deflect its scanning element in a calibration scan across a first area of a predetermined first shade of darkness and a second area of a predetermined second shade of darkness, said variable magnitude input signal being a video input signal representative of the shade of darkness of document areas being scanned by the facsimile transmitter, said means for storing a first sample including an analog track and hold circuit means normally connected to receive the variable magnitude input signal and responsive to application of a predetermined first sampling signal thereto for holding the value of the input signal then being received, said means for storing a second sample including a second analog track and hold circuit means normally connected for receiving said input signal and responsive to application of a predetermined second sampling signal thereto for holding the value of the input signal then being received as the stored second sample of said input signal, and automatic sequencing circuit means receiving the horizontal ramp deflection voltage generated by said facsimile transmitter during said calibration scan and responsive to said horizontal ramp deflection voltage for generating said first and second sampling signals and applying said first and second sampling signals to said first and second track and hold circuits when said horizontal ramp voltage rises to first and second predetermined voltage magnitudes respectively.

5. The combination defined by claim 1 wherein said apparatus is used in combination with a facsimile transmitter, said variable magnitude input signal being a video input signal representative of the shade of darkness of document areas scanned in said facsimile transmitter, such shade of darkness varying between a predetermined first magnitude representing predetermined black document areas and a second magnitude representing predetermined white document areas.

6. The combination defined by claim 5 wherein said facsimile transmitter generates a ramp deflection voltage to deflect its scanning element in a calibration scan across a first area of predetermined first shade of darkness, said means for storing a first sample being responsive to the ramp deflection voltage for automatically storing said first sample of said input signal when said ramp voltage reaches a predetermined magnitude corresponding to the scanning of said first area.

7. The combination defined by claim 6 wherein said calibration scan of said transmitter is a horizontal scan, said transmitter generating a corresponding horizontal ramp deflection voltage, said means for storing a first sample of said input signal being responsive to said horizontal ramp deflection voltage for storing said first sample whenever said horizontal ramp deflection voltage reaches a predetermined magnitude corresponding to the scanning of a predetermined black area.

8. The combination defined by claim 6 wherein said ramp deflection voltage of said transmitter deflects said transmitter scanning element in a calibration scan across both a first area of predetermined first shade of darkness and a second area of predetermined second shade of darkness, said means for storing a second sample being responsive to the ramp deflection voltage for automatically storing said second sample of said input signal when said ramp voltage reaches a second predetermined magnitude corresponding to the scanning of said second area.

9. The combination defined by claim 8 wherein said first area is a predetermined black area and said second area is a predetermined white area.

10. The combination defined by claim 8 wherein said first and second areas are established on the face of a calibration strip which is positioned outside the area of the document being scanned.

11. The combination defined by claim 8 wherein said second area is a portion of a light background area of a document being scanned, whereby background areas of the document are reproduced as a standarized shade independent of the tint or shade of the document background.

12. The combination comprising:
a facsimile transmitter including a scanning element for scanning target areas including at least target source document areas and means for producing a video input signal representative of the shade of darkness of areas being scanned by said scanning element, said target areas including a first calibration area of predetermined first shade of darkness and a second calibration area of predetermined second shade of darkness, said facsimile transmitter including deflection means for deflecting said scanning element in a calibration scan across said first and second calibration areas,
an automatic signal correction circuit means coupled to said facsimile transmitter for receiving said video input signal during scanning of said target areas and continually operating upon said received video input signal to produce a corresponding corrected video output signal, said automatic correction circuit means including:

A. first means for storing a first sample of said video input signal when said first calibration area is scanned and producing a first signal representative of said stored first sample;

B. second means for storing a second sample of said video input signal when said second calibration area is scanned and producing a second signal representing said stored second sample;

C. and third means for continually combining said received video input signal with said first and second signals during scanning of said source document areas to form said corrected video output signal.

13. The combination defined in claim 12 wherein said deflection means produces a ramp deflection voltage for deflecting said scanning element in said calibration scan, said first and second storing means being respectively responsive to application of first and second sampling signals for storing said first and second samples respectively of said video input signal, said automatic signal correction circuit means including automatic sequencing circuit means for receiving said ramp deflection voltage during said calibration scan and generating said first and second sampling signals and applying them respectively to said first and second storing means when said ramp deflection voltages rise to first and second voltage magnitudes respectively corresponding to scanning of said first and second calibration areas.

14. The combination defined by claim 12 wherein said third means combines said received video input signal with said first and second signal to continually produce an output signal representative of the difference in magnitude of said input signal and said first signal divided by the difference in magnitude of said first and second signals, whereby said output signal represents in normalized form the magnitude of the shade of darkness of the document area being scanned as a fraction of the range established between the shades of said first and second scanning areas.

15. The combination defined by claim 12 wherein said automatic signal correction circuit means is part of said facsimile transmitter and is directly connected to said means for producing said video input signal for receiving said video input signal and operating thereon.

16. The combination defined by claim 15 wherein said automatic signal correction circuit means is part of a facsimile receiver which includes a receiver demodulator coupled through a transmission path to said facsimile transmitter for receiving and demodulating a transmitted modulated form of said video input signal to produce a corresponding demodulated video input signal, said automatic signal correction circuit means being connected to said receiver demodulator for receiving said video input signal therefrom.

17. A method for operating upon a variable magnitude signal representing a parameter which varies in magnitude over a range between a predetermined low magnitude and a predetermined high magnitude, said variable amplitude signal being subject to undesired offsets and gain variations in its representation of said parameter, said method comprising the steps of:

1. storing a first sample of said variable magnitude signal when said input parameter is at its low magnitude and producing a first signal representative of said stored first sample;

2. storing a second sample of said variable magnitude signal when said input parameter is at its high magnitude and producing a second signal representative of said stored second sample;

3. thereafter during a period in which said received input signals is representing the variable magnitude parameter, continually combining said input signal and said first signal to produce a first output signal having a magnitude representative of the difference in magnitude of said input signal and said first signal;

4. combining said first signal and said second signal to produce a second output signal having a magnitude representative of the difference in magnitude of said first and second storage samples;

5. and combining said first and second output signals to produce a third output signal representative of the quotient of their magnitudes.

18. The method defined by claim 17 wherein said variable magnitude signal is a video input signal representing the parameter which is the shade of darkness of target areas being scanned in a facsimile transmitter varying between a predetermined black representing shade and a predetermined white representing shade.

* * * * *